US012455348B2

(12) United States Patent
Makridakis et al.

(10) Patent No.: US 12,455,348 B2
(45) Date of Patent: Oct. 28, 2025

(54) ANTENNA ARRAY CALIBRATION DEVICE AND METHOD (71) Applicant: Raytheon Company, Waltham, MA (US)

(72) Inventors: Patrick J. Makridakis, Mendon, MA (US); Jack J. Schuss, Newton, MA (US); Thomas V. Sikina, Acton, MA (US); Joseph E. Hilliard, Jr., Lawrence, MA (US)

(73) Assignee: Raytheon Company, Arlington, VA (US)

( * ) Notice: Subject to any disclaimer, the term of this patent is extended or adjusted under 35 U.S.C. 154(b) by 344 days.

(21) Appl. No.: 17/662,094

(22) Filed: May 5, 2022

(65) Prior Publication Data

US 2023/0358860 A1 Nov. 9, 2023

(51) Int. Cl.
*G01S 7/40* (2006.01)
*H01Q 19/17* (2006.01)
*H04Q 11/00* (2006.01)

(52) U.S. Cl.
CPC .......... *G01S 7/4008* (2013.01); *G01S 7/4021* (2013.01); *H01Q 19/17* (2013.01); *H04Q 11/0005* (2013.01); *H04Q 2011/0016* (2013.01); *H04Q 2011/0035* (2013.01); *H04Q 2213/003* (2013.01)

(58) Field of Classification Search
None
See application file for complete search history.

(56) References Cited

U.S. PATENT DOCUMENTS 8,910,230 B2  12/2014  Rakib
9,391,764 B2   7/2016  Mayer et al.
(Continued)

FOREIGN PATENT DOCUMENTS

EP   1 011 215 A2   6/2000
EP   1 630 986 A1   3/2006
(Continued)

OTHER PUBLICATIONS

Davarian, "Uplink Arraying for Solar System Radar and Radio Science;" Invited Paper; Proceedings of the IEEE, vol. 99, No. 5; May 2011; 11 Pages.
(Continued)

*Primary Examiner* — Robert W Hodge
*Assistant Examiner* — Brandon James Henson (57) ABSTRACT

Described herein is an apparatus and a method for an antenna array calibration device and method. The device comprises a radio frequency/optical (RF/optical) data center having at least one optical input/output; N single mode fibers (SMF) each having a proximal end connected to the at least one optical input/output of the RF/optical data center and a distal end, where N is a positive integer; N optical/RF dish calibrators each having an optical input/output connected to the distal end of the at least one SMF input/output; N coaxial transmission lines each having a proximal end connected to one of the RF input/output of the N optical/RF dish calibrators and a distal end; and N dish antennas each connected to the distal end of one of the N coaxial transmission lines.

17 Claims, 9 Drawing Sheets

(56) References Cited

U.S. PATENT DOCUMENTS

2012/0140780 A1* 6/2012 Chang ................ H04B 7/18517
398/43
2021/0050921 A1* 2/2021 Averay ................ H04B 1/0003

FOREIGN PATENT DOCUMENTS

KR       20090036844 A * 4/2009
WO    WO-2020010399 A1 * 1/2020

OTHER PUBLICATIONS

PCT International Search Report and Written Opinion dated Jun. 15, 2023 for International Application No. PCT/US2023/063919; 14 Pages.

Calhoun et al., "Stable Photonic Links for Frequency and Time Transfer in the Deep-Space Network and Antenna Arrays;" Proceedings of the IEEE DSN and Antenna Arrays, vol. 95, No. 10; Oct. 2007; 16 Pages.

* cited by examiner

ANTENNA ARRAY CALIBRATION DEVICE AND METHOD

BACKGROUND

Deep space radars require large arrays of dish antennas spread over distances exceeding 1 km. These dishes must be synchronized to a common clock and kept in constant radio frequency (RF) phase alignment. Phase alignment of array elements spread over these distances cannot utilize conventional coaxial cable distribution methods due to large cable loss.

A conventional method of distributing a common clock signal focused on stabilizing a single mode fiber (SMF) between each dish antenna and a data center alone uses an analog feedback method to correct for phase changes in the fiber. However, this approach does not address the complete end-to-end optical and RF pathways at the remote element location. This approach only considers RF phase changes in the external SMF interface.

SUMMARY

In accordance with the concepts described herein, example antenna array calibration devices and methods utilize linear RF over fiber components to distribute signals, such as a common clock and RF test signals over a SMF, where phase alignment is achieved by facilitating remote boundary condition (RBC) short open load (SOL) RF calibration at each dish antenna from a common measurement equipment and RF sources located at a data center.

In accordance with the concepts described herein, example antenna array calibration devices and methods apply RBC calibration methods to a fiber RF distribution network to calibrate radar array elements distributed over long distances (e.g., ~1.5 km).

In accordance with the concepts described herein, example antenna array calibration devices and methods provide linear RF over fiber components located at a data center and each dish antenna provides a bidirectional path connection via one SMF.

In accordance with the concepts described herein, example antenna array calibration devices and methods provide SOL path characterization measured at each dish antenna using at a common digital receiver/exciter (DREX) located at a data center.

In accordance with the concepts described herein, example antenna array calibration devices and methods provide SOL calibration performed as frequently as necessary to correct for phase changes in the fiber and/or RF pathways/components due to time, temperature, and/or physical movement of coaxial and/or dish antenna array components.

In accordance with the concepts described herein, example antenna array calibration devices and methods provide a bidirectional RF calibration signal from the data center distributed to N remote dish antenna arrays over N SMF using linear electrical/optical and optical/electrical components and optical wavelength division multiplex (WDM) techniques.

In accordance with the concepts described herein, example antenna array calibration devices and methods provide RBC at each dish antenna, where system software periodically measures and corrects for phase changes in the entire RF-to-optical-to-RF path.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The present disclosure provides exemplary antenna array calibration devices and methods.

Example embodiments of the disclosure are directed to the problem of calibration and alignment of radar array elements distributed over a wide area (e.g., 1 km, 2 km, etc.). In an exemplary embodiment, the device and method initially align and maintain alignment of an array of dish antenna elements distributed over a wide area (e.g., greater than 1.5 km) to a small degree in phase (e.g., much less than 10 degrees). The device and method compensate for errors in an antenna array including RF connections and components in the system. Calibration may be software controlled and may be integrated into a real-time radar scheduler to correct for dish beam position movement, time temporal stability effects, and temperature.

In an exemplary embodiment, linear RF over Fiber optic components distribute a common clock and RF test signals over one SMF. Phase alignment is achieved by facilitating RBC SOL RF calibration at each dish antenna from a common measurement equipment and RF sources located at a data center. The RF over fiber interface uses linear wavelength division multiplexers and optical transceivers to send a DREX clock and a bidirectional RF calibration signal over one SMF. The RF over fiber interface provides a virtual coaxial transmission line between the common measurement equipment located in the data center and each remote dish antenna array. Each dish antenna array may include RBC SOL calibration components to accurately characterize and align the phase at each dish antenna by compensating for phase changes in the end-to-end RF and optical pathways. The RBC calibration may be software controlled and may be integrated into scheduling to compensate for time, temperature, and dish antenna movement on-the-fly.

In an exemplary embodiment, analog fiber stabilization may be utilized but is not necessary. The RF over fiber components may include a sampling clock and components to compensate for fiber alone phase changes as well as a bidirectional RF calibration signal and dish antenna DREX clock. In an exemplary embodiment, 23 dish antenna arrays may be distributed over more than 1.5 km from a data center.

Performing calibration of array elements distributed over an area greater than 1.5 km prohibits the use of only a coaxial transmission line due to an inadequate signal to noise ratio resulting from high cable loss. The present disclosure may be utilized to phase align a radar system with elements distributed over wide areas that prohibit the use of only a coaxial transmission line.

In an exemplary embodiment, bidirectional RF measurements allowing for phase changes, fiber, and RF components between a data center and dish antenna arrays to be characterized and compensated. System phase calibration may be performed as needed to ensure accurate antenna array element alignment, including each time a dish antenna is moved to a new beam position.

The present disclosure provides a low-complexity, low-cost solution to maintaining phase alignment between antenna array elements distributed over large distances.

Figure 1:
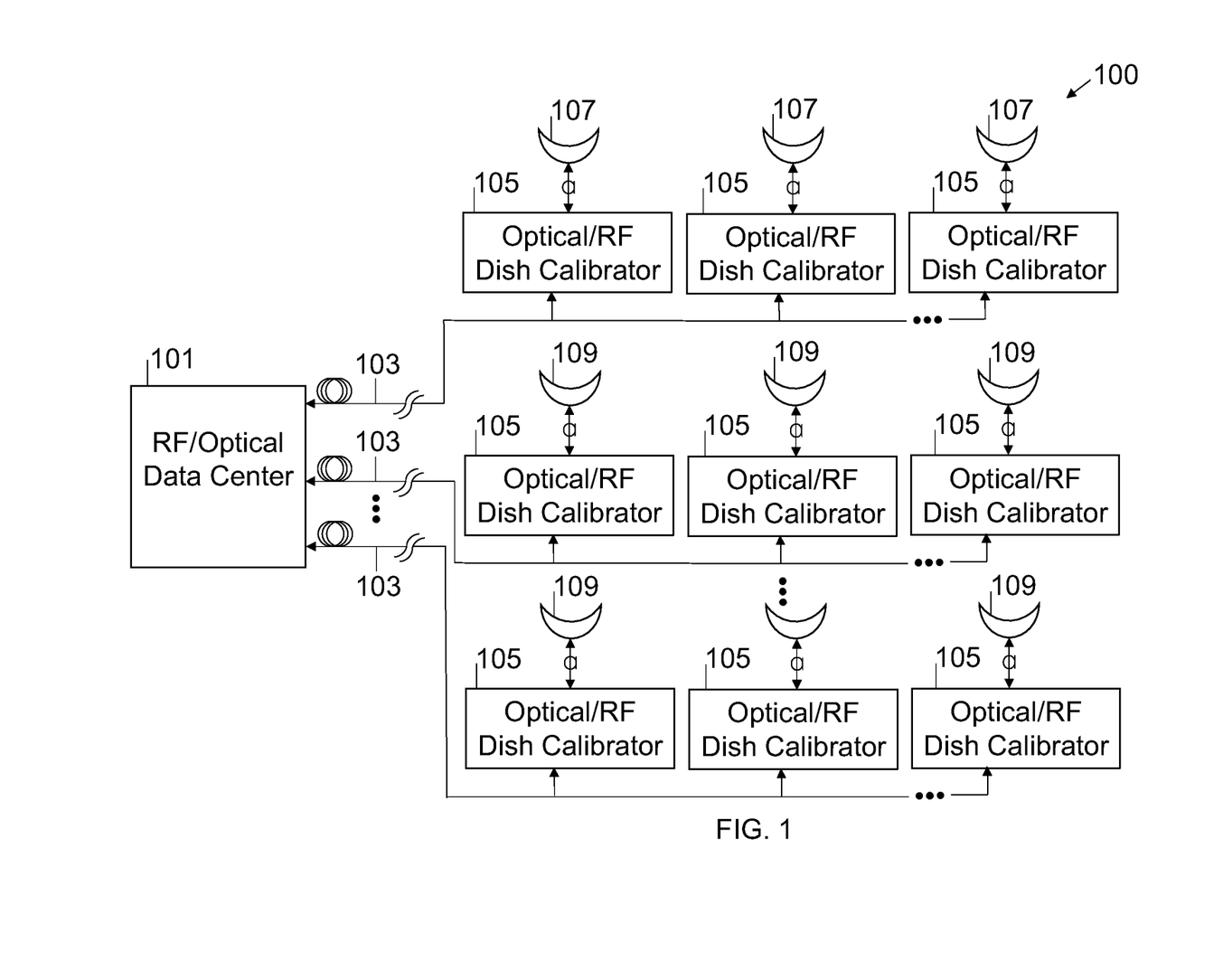
FIG. 1 is an illustration of an example embodiment of an antenna array calibration device.

FIG. 1 is an illustration of an example embodiment of an antenna array calibration device 100. In the example embodiment, the antenna array calibration device 100 comprises an RF/optical data center 101, N SMFs 103, at least one optical/RF dish calibrator devices 105, and at least one dish antenna, where N is a positive integer. In an example embodiment, there may be an SMF 103 for each dish antenna array used in the antenna array calibration device 100. In addition, each dish antenna array may comprise a plurality of receive dish antennas 107 or a plurality of transmit dish antennas 109.

The RF/optical data center 101 comprises a bidirectional input/output connected to each of the N SMFs 103. Each SMF 103 is connected to at least one optical/RF dish calibrator device 105. Each optical/RF dish calibrator device 105 comprises a bidirectional input/output connected to a receive dish antenna 107 or a transmit dish antenna 109.

Figure 2:
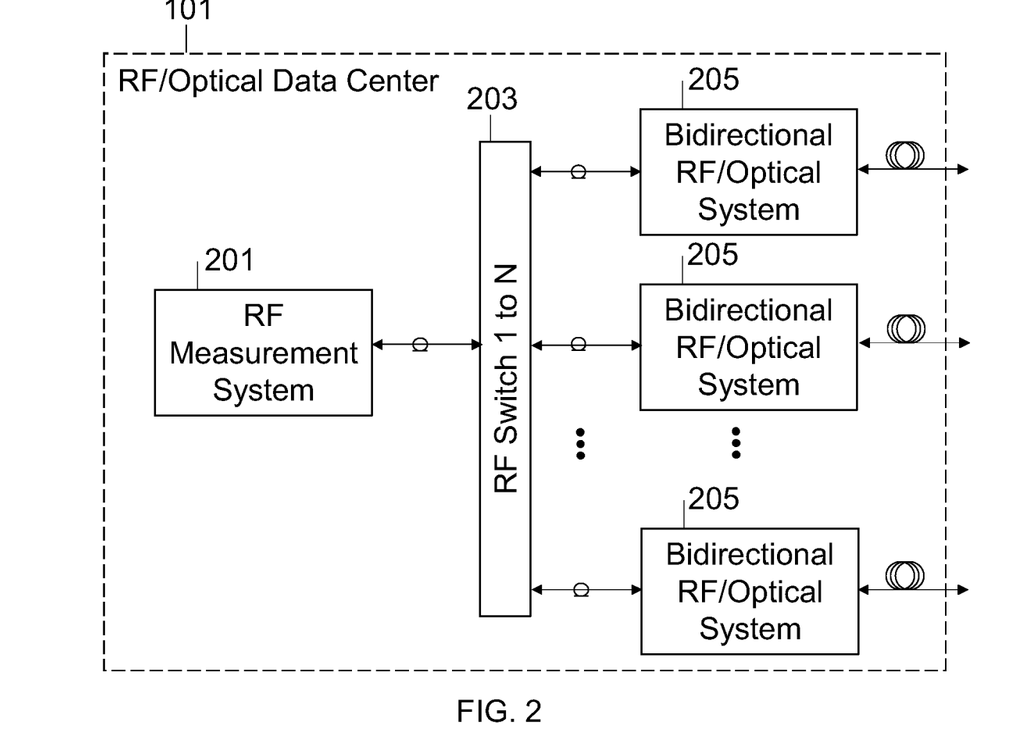
FIG. 2 is an illustration of an example embodiment of an RF/optical data center of FIG. 1.

FIG. 2 is an illustration of an example embodiment of an RF/optical data center 101 of FIG. 1. In the example embodiment, the RF/optical data center 101 comprises an RF measurement system 201, a 1 to N RF switch 203, and N bidirectional RF/optical systems 205, where N is a positive integer. There is a bidirectional RF/optical system 205 for each dish antenna array in the antenna array calibration device 100. As noted above, each dish antenna array may have one or more receive 107 or transmit 109 dishes.

The RF measurement system 201 comprises a bidirectional input/output connected to the 1 to N RF switch 203 via a coaxial transmission line. The 1 to N RF switch 203 comprises a first bidirectional input/output connected to the RF measurement system 201 via a coaxial transmission line and N bidirectional inputs/outputs connected to N coaxial transmission lines, respectively. Each bidirectional RF/optical systems 205 comprises a first bidirectional input/output connected to the 1 to N RF switch 203 via a coaxial transmission line and a bidirectional input/output connected to a SMF.

Figure 3:
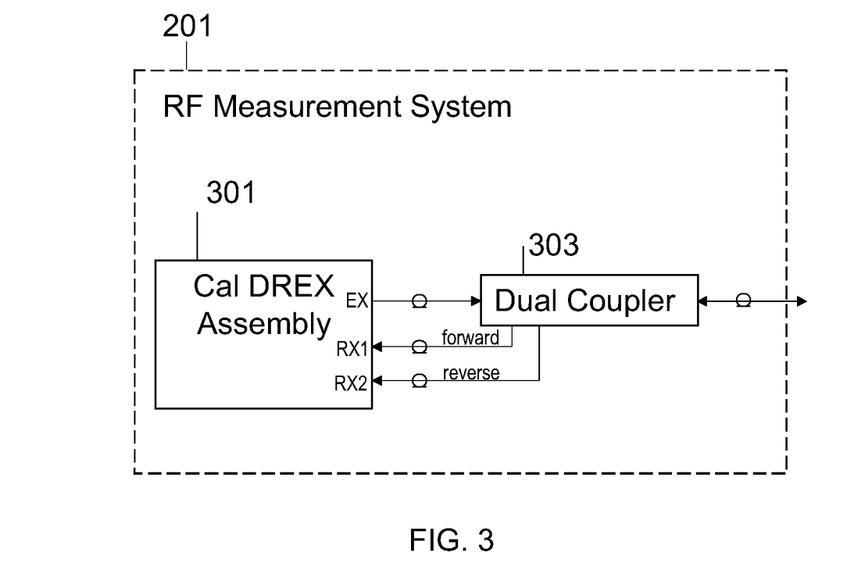
FIG. 3 is an illustration of an example embodiment of an RF measurement system of FIG. 2.

FIG. 3 is an illustration of an example embodiment of the RF measurement system 201 of FIG. 2. In the example embodiment, the RF measurement system 201 comprises a calibration DREX assembly 301 and a dual coupler 303. The forward path from the dual coupler provides a reference signal directly proportional to the calibration DREX assembly 301 EX output. The reverse path from the dual coupler carries the return signal from the SOL standard located at the dish array selected by the 1:N RF Switch 203 shown above in FIG. 2.

The calibration DREX assembly 301 has an output EX connected to a first input of the dual coupler 303 via a coaxial transmission line, a first input RX1 connected to a first output of the dual coupler 303 via a coaxial transmission line for receiving a forward signal, and a second input RX2 connected to a second output of the dual coupler 303 via a coaxial transmission line for receiving a reverse signal. A bidirectional input/output of the dual coupler 303 is the coaxial-transmission-line output of the RF measurement system 201.

Figure 4:
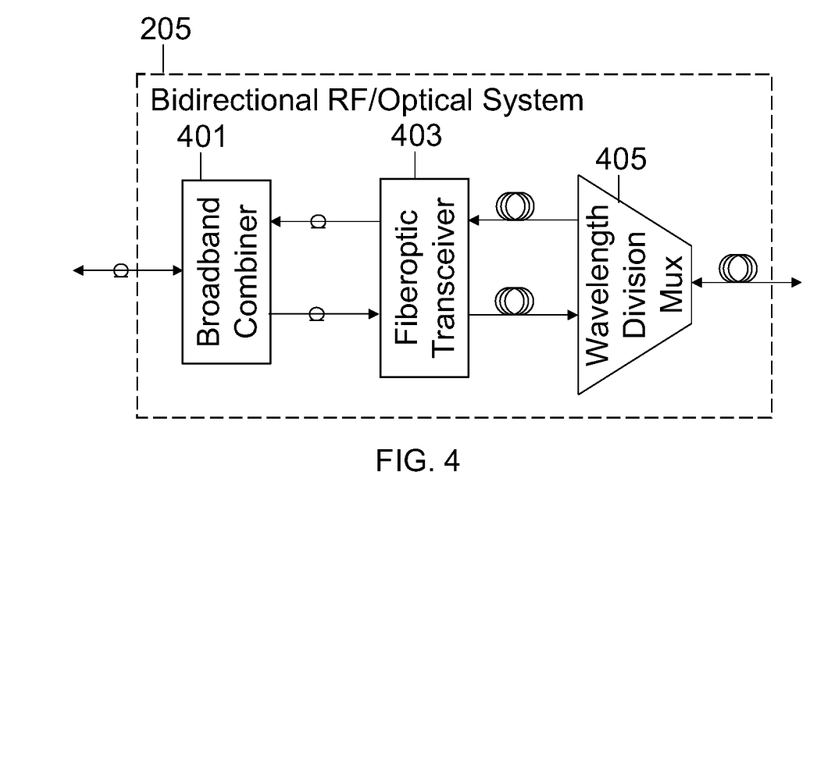
FIG. 4 is an illustration of an example embodiment of a bidirectional RF/optical system of FIG. 2.

FIG. 4 is an illustration of an example embodiment of one of the N bidirectional RF/optical systems 205 of FIG. 2. In the example embodiment, each of the bidirectional RF/optical systems 205 comprises a broadband combiner 401, a fiberoptic transceiver 403, and a waveform division multiplexer (WDM) 405.

The broadband combiner 401 comprises a first bidirectional input/output connected to the input/output coaxial transmission line of the bidirectional RF/optical system 205, an input connected to a coaxial transmission line, and an output connected to a coaxial transmission line. The fiberoptic transceiver 403 comprises a first output connected to the input of the broadband combiner 401 via a coaxial transmission line, a first input connected to the output of the broadband combiner 401 via a coaxial transmission line, a second input connected to a SMF, and a second output connected to a SMF. The WDM 406 comprises a first output connected the second input of the fiberoptic transceiver 403 via a SMF, a first input connected the second output of the fiberoptic transceiver 403 via a SMF, and a second bidirectional input/output connected to a SMF that is the bidirectional input/output of the bidirectional RF/optical system 205.

Figure 5:
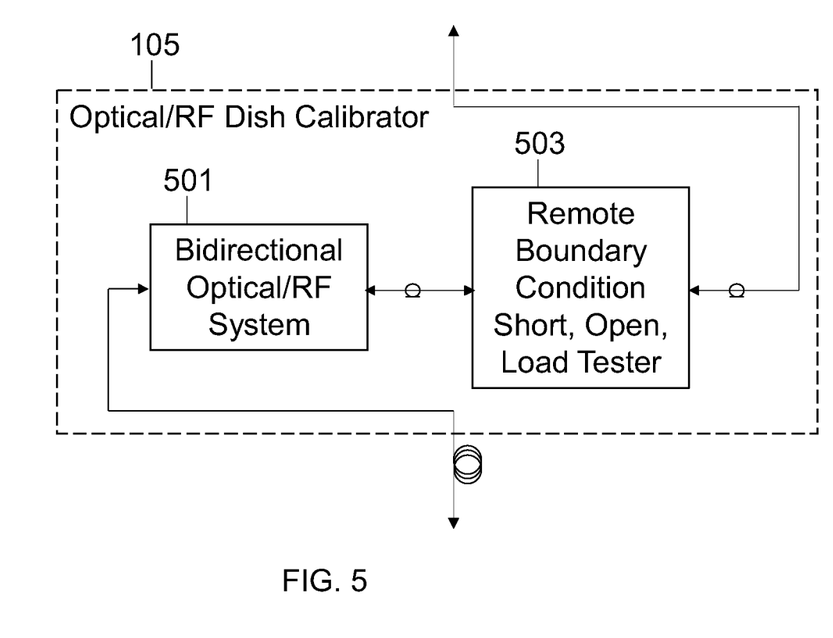
FIG. 5 is an illustration of an example embodiment of an optical/RF dish calibrator of FIG. 1.

FIG. 5 is an illustration of an example embodiment of the optical/RF dish calibrator 105 of FIG. 1. In the example embodiment, the optical/RF dish calibrator 105 comprises a bidirectional optical/RF system 501 and a remote boundary condition short, open, and load (RBC SOL) tester 503.

The bidirectional optical/RF system 501 comprises a bidirectional input/output SMF and a bidirectional input/output coaxial transmission line, where the SMF is the fiberoptic bidirectional input/output of the optical/RF dish calibrator 105. The RBC SOL tester 503 comprises a bidirectional input/output connected to the bidirectional coaxial input/output of the bidirectional optical/RF system 501 and a second bidirectional input/output coaxial transmission line, where the second bidirectional input/output line is the coaxial bidirectional input/output of the optical/RF dish calibrator 105 from/to its respective dish array.

Figure 6:
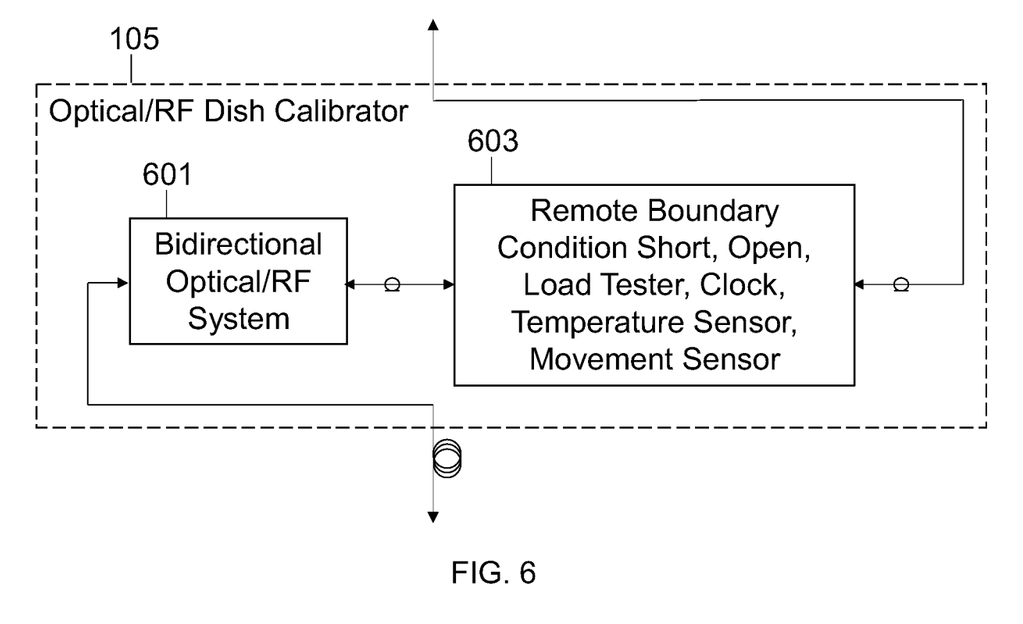
FIG. 6 is an illustration of an example embodiment of an alternate optical/RF dish calibrator of FIG. 1.

FIG. 6 is an illustration of an example embodiment of an alternate optical/RF dish calibrator 105 of FIG. 1. In the example embodiment, the optical/RF dish calibrator 105 comprises a bidirectional optical/RF system 601 and a RBC SOL clock, temperature sensor, and movement sensor tester 603 that facilitates the end-to-end RF to optical to RF pathway calibration and alignment between each Dish antenna and common data center.

The bidirectional optical/RF system 601 comprises a bidirectional input/output SMF and a bidirectional input/output coaxial transmission line, where the SMF is the fiberoptic bidirectional input/output of the optical/RF dish calibrator 105. The RBC SOL clock, temperature sensor, and movement sensor tester 603 comprises a bidirectional input/ output connected to the bidirectional coaxial input/output of the bidirectional optical/RF system 601 and a bidirectional input/output coaxial transmission line, where the bidirectional input/output coaxial transmission line is the coaxial bidirectional input/output of the optical/RF dish calibrator 105. In an example embodiment, the optical/RF dish calibrator 105 can recalibrate on the fly due to user-definable changes in time (e.g., at a user-settable time (e.g., at a certain minute, hour, day, etc.), after lapses of user-definable units of time (e.g., after a certain number of seconds, minutes, hours, days, etc.), temperature (e.g., at certain temperatures, after a change in a certain number of degrees, etc.), and movement (e.g., at certain locations, after a change in a certain number of fractions of inches, inches, feet, etc.). The RBC SOL calibration may be software initiated and controlled. The frequency of operation may be periodic at set intervals or initiated based on known changes or movement in the dish antenna.

Figure 7:
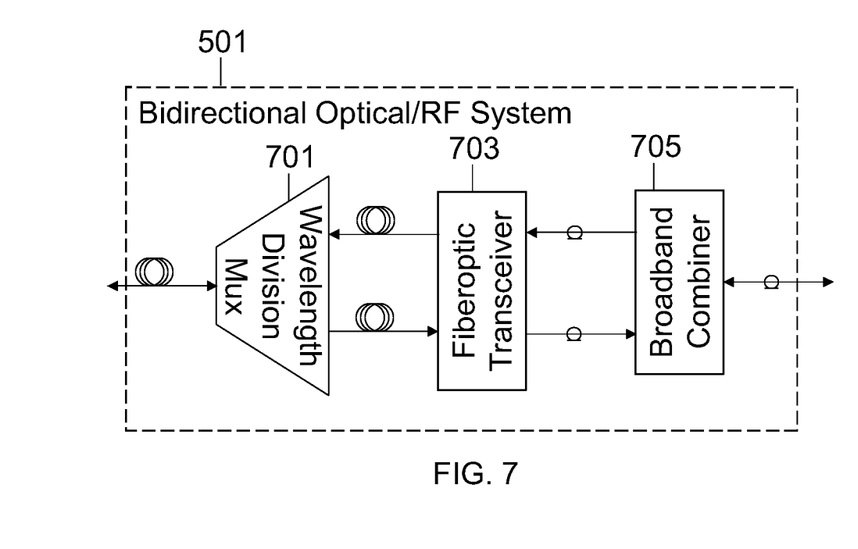
FIG. 7 is an illustration of an example embodiment of a bidirectional optical/RF system of FIG. 5.

FIG. 7 is an illustration of an example embodiment of a bidirectional optical/RF system 501 of FIG. 5. In the example embodiment, the bidirectional optical/RF system 501 comprises a WDM 701, a fiberoptic transceiver 703, and a broadband combiner 705. FIG. 7 illustrates the optical to RF conversion whereas FIG. 4 illustrates the RF to optical conversion.

The WDM 701 comprises a first bidirectional input/output connected to a SMF that is the bidirectional input/output of the bidirectional optical/RF system 501, an input connected a first output of the fiberoptic transceiver 703 via a SMF, and an output connected a first input of the fiberoptic transceiver 703 via a SMF. The fiberoptic transceiver 703 comprises a first output connected to the input of the WDM 701 via a SMF, a first input connected to the output of the WDM 701 via a SMF, a second output connected to a coaxial transmission line, and a second input connected to a coaxial transmission line. The broadband combiner 705 comprises an input connected to the second output of the fiberoptic transceiver 703 via a coaxial transmission line, an output connected to the second input of the fiberoptic transceiver 703 via a coaxial transmission line, and a bidirectional input/output connected to the input/output coaxial transmission line of the bidirectional RF/optical system 501.

Figure 8:
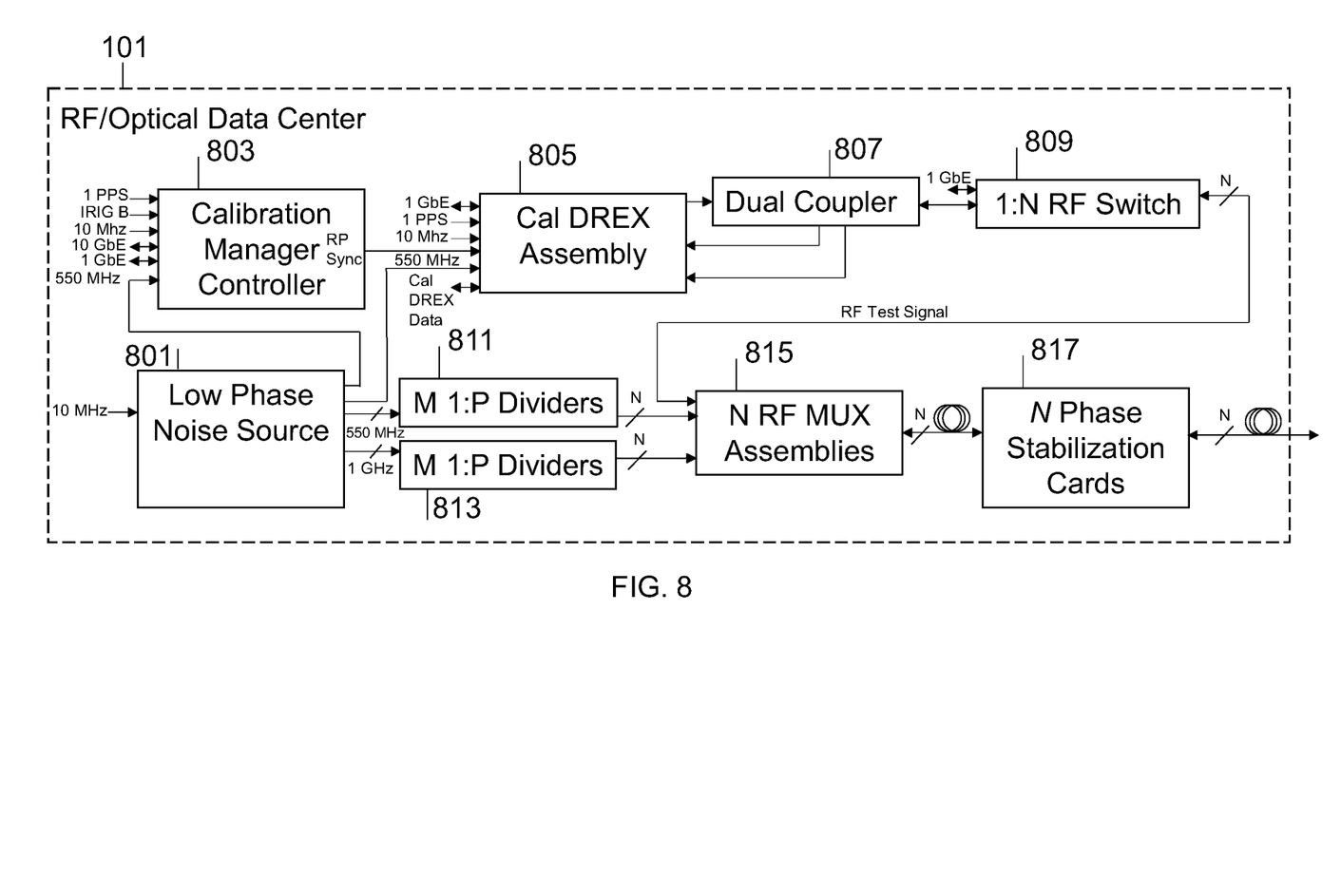
FIG. 8 is an illustration of an example embodiment of an alternate RF/optical data center of FIG. 1.

FIG. 8 is an illustration of an example embodiment of a RF/optical data center 101 of FIG. 1. In the example embodiment, the RF/optical data center 101 comprises a low phase noise source 801, a calibration manager controller 803, a calibration DREX 805, a dual coupler 807, a 1 to N RF switch 809, M first 1 to P dividers 811, M second 1 to P dividers 813, N RF multiplexer assemblies 815, and N phase stabilization cards 817, where N, M, and P are positive integers.

The low phase noise source 801 comprises an input configured to receive a 10 MHz signal, a first output configured to provide a 550 MHz signal, a second output configured to provide a 550 MHz signal, a third output configured to provide a 550 MHz signal, and a fourth output configured to provide a 1 GHz signal. The calibration manager controller 803 comprises a first input configured to receive a 1 pulse per second signal, a second input configured to receive an inter-Range instrumentation Group Time Code Format B (IRIG B) signal, a first bidirectional input/output configured to receive a 10 gigabit ethernet (GbE) signal, a second bidirectional input/output configured to receive a 1 GbE signal, a third input connected to the first 550 MHz output of the low phase noise source 801, and an output configured to provide a Resource Period (RP) RP synchronization signal (RP sync).

The calibration DREX 805 comprises a first bidirectional input/output configured to receive a 1 GbE signal, a first input configured to receive a 1 pulse per second signal, a second input configured to receive a 10 MHz signal, a third input connected to the RP sync output of the calibration manager controller 803, a fourth input connected to the second 550 MHz output of the low phase noise source 801, a second bidirectional input/output configured to receive calibration DREX data, a third output, a sixth input configured to receive a forward signal, and a seventh input configured to receive a reverse signal. The dual coupler 807 comprises a first input/output connected to the third output of the calibration DREX assembly 805, a first output connected to the sixth input of the calibration DREX 805 assembly and configured to provide the forward signal, a second output connected to the seventh input of the calibration DREX assembly 805 and configured to provide the reverse signal, and a second bidirectional input/output.

The 1 to N RF switch 809 comprises a first bidirectional input/output configured to receive a 1 GbE signal, a first input/output connected to the output of the dual coupler 807, a second bidirectional input/output configured to provide an RF calibration signal.

The M (e.g., 4) first 1 to P (e.g., 6) dividers 811 comprises an input bus for receiving M 550 MHz signals and an output bus configured to provide N (e.g., 23) 550 MHz signals. The M (e.g., 4) second 1 to P (e.g., 6) dividers 813 comprises an input bus for receiving M 550 MHz signals and an output bus configured to provide N (e.g., 23) 550 MHz signals.

The N RF multiplexer assemblies 815 comprise a first bidirectional input/output connected to the second bidirectional input/output of the 1 to N RF switch 809 and configured to receive the RF calibration signal, a first input bus connected to the output bus of the first M1 to P dividers 811, a second input bus connected to the output bus of the second M1 to P dividers 813, and a bidirectional input/output bus configured to provide N input/output signals, where the bidirectional input/output bus comprises a SMF. The N phase stabilization cards 817 comprise a first bidirectional input/output bus connected to the bidirectional input/output bus of the N RF multiplexer assemblies 815 and a second bidirectional input/output bus configured to provide N signals, where the first bidirectional input/output bus and the second bidirectional input/output bus each comprise a SMF, and where the second bidirectional input/output bus comprises the N bidirectional inputs/outputs of the RF/optical data center 101. The N phase stabilization cards 817 are part of the analog phase correction of the SMF only. The example embodiment may correct for the phase changes in the entire RF to optical to RF chain independent of fiber stabilization including the absence of analog fiber stabilization.

Figure 9:
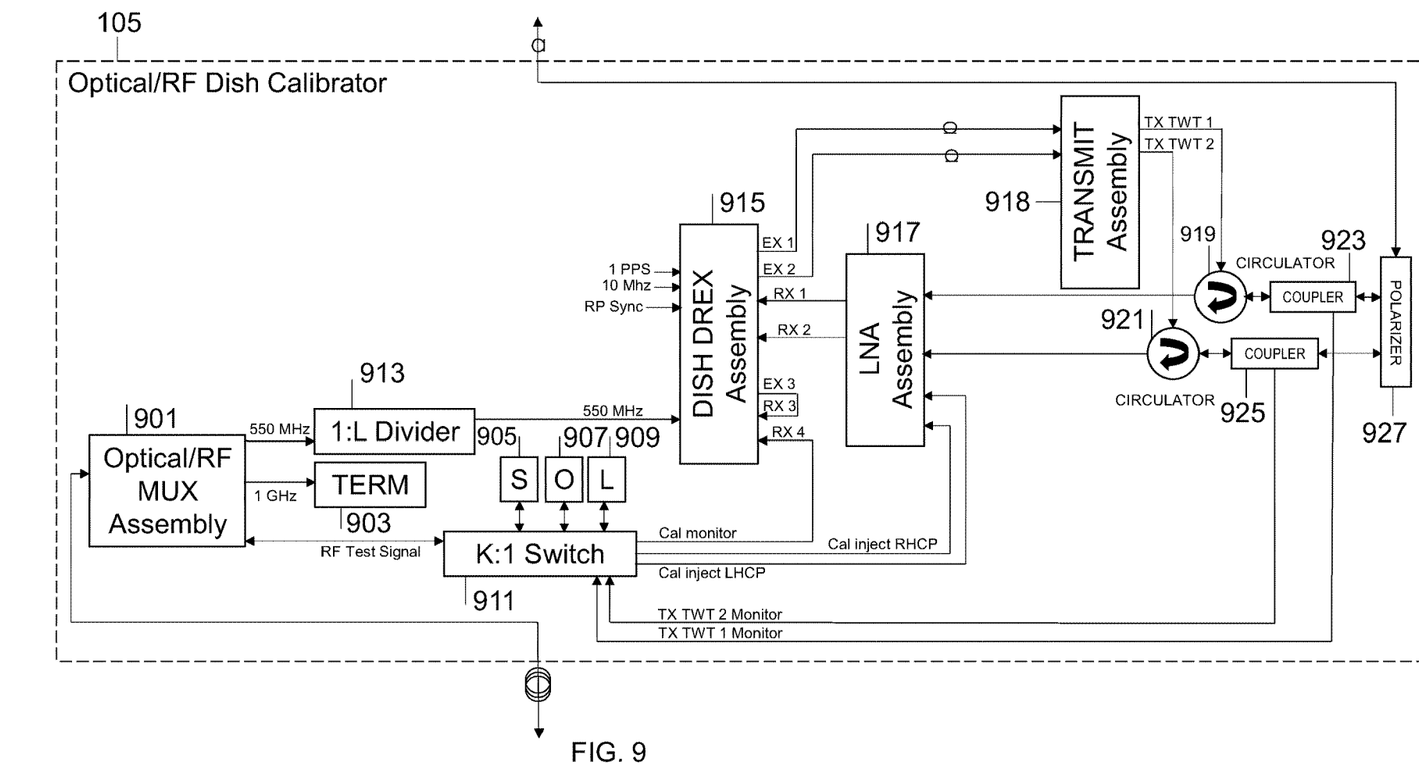
FIG. 9 is an illustration of an example embodiment of an alternate optical/RF dish calibrator of FIG. 1.

FIG. 9 is an illustration of an example embodiment of an optical/RF dish calibrator 105 of FIG. 1. In the example embodiment, the optical/RF dish calibrator 105 comprises an RF/optical multiplexer assembly 901, a termination (TERM) device 903 (e.g., a 50 ohm termination), a short test device 905, an open test device 907, a load test device 909, a K to 1 switch 911, a 1 to L (e.g., 2) divider 913, a dish antenna DREX assembly 915, a low noise amplifier (LNA) assembly 917, a transmit assembly 918, a first circulator 919, a second circulator 921, a first coupler 923, a second coupler 925, and a polarizer 927, where K (e.g., 8) and L (e.g., 2) are positive integers.

The RF/optical multiplexer assembly 901 comprises a bidirectional optical input/output configured to connect to the RF/optical data center 101, a bidirectional RF input/output configured to provide an RF calibration signal (e.g., RF Test Signal), a first RF output configured to provide a 550 MHz signal, and a second RF output configured to provide a 1 GHz signal. The TERM device 903 comprises an RF input connected to the second RF output of the RF/optical multiplexer assembly 901.

The short test device 905 comprises an RF input/output. The open test device 907 comprises an RF input/output. The load test device 909 comprises an RF input/output. The short test device 905, the open test device 907, and the load test device 909 constitute the calibration standards. The K to 1 switch 911 comprises a first bidirectional RF input/output connected to the bidirectional RF input/output of the RF/optical multiplexer assembly 901, a second bidirectional RF input/output connected to the RF input/output of the short test device 905, a third bidirectional RF input/output connected to the RF input/output of the open test device 907, a fourth bidirectional RF input/output connected to the RF input/output of the load test device 909, a first RF output configured to provide a calibration monitor signal (Cal monitor), a second RF output configured to provide a calibration inject right-hand circular polarized (RHCP) signal (Cal inject RHCP), a third RF output configured to provide a calibration inject left-hand circular polarized (LHCP) signal (Cal inject LHCP), a first RF input (TX TWT 1 Monitor) configured to monitor the RF output of the first coupler 923, and a second RF input (TX TWT 2 Monitor) configured to monitor an RF output of the second coupler 925. The first RF input and the second RF input are used to monitor and maintain calibration of the transmit RF signal. For a receive only dish antenna, the first RF input and the second RF input are not needed.

The 1 to L divider 913 comprises an RF input connected to the first RF output of the RF/optical multiplexer assembly 901 and an RF output (e.g., a 550 MHz signal). The dish antenna DREX assembly 915 comprises a first RF input configured to receive a 1 pulse per second signal, a second RF input configured to receive a 10 MHz signal, a third RF input configured to receive a RP sync signal, a fourth RF input connected to the RF output of the 1 to L divider 913, a fifth RF input (RX4) connected to the first RF output of the K to 1 switch 911, a first RF output connected to a sixth RF input (RX3) and configured to provide a third external reference signal (EX 3), a seventh RF input, an eighth RF input, a second RF output configured to provide a second external reference signal (EX 2), and a third RF output configured to provide a first external reference signal (EX 1).

The LNA assembly 917 comprises a first RF output connected to the seventh RF input of the dish DREX assembly 915 and configured to provide an RX 2 LHCP signal, a second RF output connected to the eighth RF input of the dish DREX assembly 915 and configured to provide an RX 1 RHCP signal, a first RF input connected to the second output of the K to 1 switch 911 and configured to receive the calibration inject RHCP signal, a second RF input connected to the third output of the K to 1 switch 911 and configured to receive the calibration inject LHCP signal, a third RF input, and a fourth RF input. The transmit assembly 918 comprises a first RF input connected to the third RF output of the dish antenna DREX assembly 915 configured to receive EX 1, a second RF input connected to the second RF output of the dish antenna DREX assembly 915 configured to receive EX 2, a first RF output configured to transmit TX TWT 1, and a second RF output configured to transmit TX TWT 2. The first bidirectional RF input/output of the LNA assembly 917 monitors a receive signal from the dish (through the first coupler 923 and the first circulator 919) and the second bidirectional RF input/output of the LNA assembly 917 monitors a second receive signal from the dish (through the second coupler 925 and the second circulator 921). The first circulator 923 and the second circulator 925 are also connected to the transmitter signals to provide a transmit function for a transmit/receive dish.

The first circulator 919 comprises an RF input connected to the first RF output of the transmit assembly 918 and configured to receive TX TWT 1, a RF output connected to the fourth RF input of the LNA assembly 917, and a bidirectional RF input/output. The second circulator 921 comprises a RF input connected to the second RF output of the transmit assembly 918 and configured to receive TX TWT 2, a RF output connected to the third RF input of the LNA assembly 917, and a bidirectional RF input/output.

The first coupler 923 comprises a first bidirectional RF input/output connected to the bidirectional RF input/output of the first circulator 919, a second bidirectional RF input/output, and a RF output connected to the first RF input of the K to 1 switch 911 and configured to receive the TX TWT 1 Monitor signal. The second coupler 925 comprises a first bidirectional RF input/output connected to the bidirectional RF input/output of the second circulator 921, a second bidirectional RF input/output, and a RF output connected to the second RF input of the K to 1 switch 911 and configured to receive the TX TWT 2 Monitor signal. The polarizer 927 comprises a first bidirectional RF input/output connected to the second bidirectional RF input/output of the first coupler, a second bidirectional RF input/output connected to the second bidirectional RF input/output of the second coupler, and a third bidirectional RF input/output that comprises the bidirectional RF input/output of the optical/RF dish calibrator 105.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal," "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An antenna array calibration device, comprising:
   a radio frequency/optical (RF/optical) data center having at least one optical input/output;
   multiple single mode fibers (SMFs) each having a proximal end connected to the at least one optical input/output of the RF/optical data center and a distal end;
   multiple optical/RF dish calibrators each having an optical input/output connected to the distal end of one of the SMFs and an RF input/output;
   multiple coaxial transmission lines each having a proximal end connected to the RF input/output of one of the optical/RF dish calibrators and a distal end; and
   multiple dish antennas each connected to the distal end of one of the coaxial transmission lines;
   wherein the RF/optical data center comprises:
      an RF measurement system having an RF input/output;

a coaxial transmission line having a proximal end connected to the RF input/output of the RF measurement system and a distal end;

an RF switch having an RF input/output connected to the distal end of the coaxial transmission line and multiple RF input/outputs;

a radar scheduler configured to correct, based on phase information received via the multiple SMFs, each of dish beam position movement, time temporal stability effects, and temperature effects on one or more dish antennas of the multiple dish antennas;

a low phase noise source having a 10 MHz input, a 550 MHz output, a 1 GHz output, a first output bus, and a second output bus;

a calibration manager controller having a 1 pulse per second (PPS) input, an Inter-Range Instrumentation Group Time Code Format B (IRIG B) input, a 10 MHz input, a 10 Gigabit Ethernet (GbE) input, a 1 GbE input, a 550 MHz input connected to the 550 MHz output of the low phase noise source, and a resource period (RP) synchronization (sync) output;

a calibration digital receiver/exciter (DREX) assembly having a 1 GbE input, a 1 PPS input, a 10 MHz input, a first input connected to the RP sync output of the calibration manager controller, a second input connected to the 550 MHz output of the low phase noise source, a calibration DREX data input/output, an output, a third input, and a fourth input;

a dual coupler having a first input/output connected to the output of the calibration DREX assembly, a first output connected to the third input of the calibration DREX assembly, a second output connected to the fourth input of the calibration DREX assembly, and a second input/output;

multiple first dividers each having an input bus connected to the first output bus of the low phase noise source and an output bus;

multiple second dividers each having an input bus connected to the second output bus of the low phase noise source and an output bus;

multiple RF multiplexer assemblies each having an input/output bus connected to the input/output bus of the RF switch, a first input bus connected to the output bus of one of the first dividers, a second input bus connected to the output bus of one of the second dividers, and an optical input/output bus; and multiple phase stabilization cards each having a first optical input/output bus connected to the optical input/output bus of one of the RF multiplexer assemblies and a second optical input/output bus;

wherein the RF switch has a 1 GbE input and an RF input/output bus.

2. The antenna array calibration device of claim 1, wherein the RF/optical data center further comprises:
multiple bidirectional RF/optical systems each having an RF input/output connected to one of the RF inputs/outputs of the RF switch and an optical input/output.

3. The antenna array calibration device of claim 2, wherein each of the bidirectional RF/optical systems comprises:
a broadband combiner having an RF input/output, an RF input, and an RF output;
a fiberoptic transceiver having an RF output connected to the RF input of the broadband combiner, an RF input connected to the RF output of the broadband combiner, an optical input, and an optical output; and a wavelength division multiplexer (WDM) having an optical output connected to the optical input of the fiberoptic transceiver, an optical input connected to the optical output of the fiberoptic transceiver, and an optical input/output.

4. The antenna array calibration device of claim 1, wherein each of the optical/RF dish calibrators comprises:
a bidirectional optical/RF system having an optical input/output and an RF input/output; and
a tester having a first RF input/output and a second RF input/output, wherein the tester further comprises:
a clock;
a temperature sensor; and
a movement sensor.

5. The antenna array calibration device of claim 4, wherein the bidirectional optical/RF system comprises:
a wavelength division multiplexer (WDM) having an optical input/output, an optical input, and an optical output;
a fiberoptic transceiver having an optical output connected to the optical input of the WDM, an optical input connected to the optical output of the WDM, an RF input, and an RF output; and
a broadband combiner having an RF output connected to the RF input of the fiberoptic transceiver, an RF input connected to the RF output of the fiberoptic transceiver, and an RF input/output.

6. The antenna array calibration device of claim 1, wherein the dish antennas comprise at least one receive antenna array and/or at least one transmit antenna array.

7. The antenna array calibration device of claim 1, wherein at least two dish antennas of the multiple dish antennas are separated by at least one kilometer.

8. An antenna array calibration device, comprising:
a radio frequency/optical (RF/optical) data center having at least one optical input/output;
multiple single mode fibers (SMFs) each having a proximal end connected to the at least one optical input/output of the RF/optical data center and a distal end;
multiple optical/RF dish calibrators each having an optical input/output connected to the distal end of one of the SMFs and an RF input/output;
multiple coaxial transmission lines each having a proximal end connected to the RF input/output of one of the optical/RF dish calibrators and a distal end; and
multiple dish antennas each connected to the distal end of one of the coaxial transmission lines;
wherein the RF/optical data center comprises:
an RF measurement system having an RF input/output;
a coaxial transmission line having a proximal end connected to the RF input/output of the RF measurement system and a distal end;
an RF switch having an RF input/output connected to the distal end of the coaxial transmission line and multiple RF input/outputs;
a low phase noise source having a 10 MHz input, a 550 MHz output, an output, a first output bus, and a second output bus;
a calibration manager controller having a 1 pulse per second (PPS) input, an Inter-Range Instrumentation Group Time Code Format B (IRIG B) input, a 10 MHz input, a 10 Gigabit Ethernet (GbE) input, a 1 GbE input, a 550 MHz input connected to the 550 MHz output of the low phase noise source, and a resource period (RP) synchronization (sync) output;
a calibration digital receiver/exciter (DREX) assembly having a 1 GbE input, a 1 PPS input, a 10 MHz input, a first input connected to the RP sync output of the calibration manager controller, a second input connected to the output of the low phase noise source, a calibration DREX data input/output, an output, a third input, and a fourth input;

a dual coupler having a first input/output connected to the output of the calibration DREX assembly, a first output connected to the third input of the calibration DREX assembly, a second output connected to the fourth input of the calibration DREX assembly, and a second input/output;

multiple first dividers each having an input bus connected to the first output bus of the low phase noise source and an output bus;

multiple second dividers each having an input bus connected to the second output bus of the low phase noise source and an output bus;

multiple RF multiplexer assemblies each having an input/output bus connected to the input/output bus of the RF switch, a first input bus connected to the output bus of one of the first dividers, a second input bus connected to the output bus of one of the second dividers, and an optical input/output bus; and multiple phase stabilization cards each having a first optical input/output bus connected to the optical input/output bus of one of the RF multiplexer assemblies and a second optical input/output bus;

wherein the RF switch has a 1 GbE input and an RF input/output bus.

9. An antenna array calibration device, comprising:

a radio frequency/optical (RF/optical) data center having at least one optical input/output;

multiple single mode fibers (SMFs) each having a proximal end connected to the at least one optical input/output of the RF/optical data center and a distal end;

multiple optical/RF dish calibrators each having an optical input/output connected to the distal end of one of the SMFs and an RF input/output;

multiple coaxial transmission lines each having a proximal end connected to the RF input/output of one of the optical/RF dish calibrators and a distal end; and multiple dish antennas each connected to the distal end of one of the coaxial transmission lines;

wherein the RF/optical data center comprises:

an RF measurement system having an RF input/output;

a coaxial transmission line having a proximal end connected to the RF input/output of the RF measurement system and a distal end; and an RF switch having an RF input/output connected to the distal end of the coaxial transmission line and multiple RF input/outputs; and wherein each of the optical/RF dish calibrators comprises:

an optical/RF multiplexer assembly having an optical input/output, a first RF output, a second RF output, and an RF input/output;

a divider having an RF input connected to the first RF output of the optical/RF multiplexer assembly and multiple RF outputs;

a termination (TERM) device having an RF input connected to the second RF output of the optical/RF multiplexer assembly;

a switch having an RF input/output connected to the RF input/output of the optical/RF multiplexer assembly, a first RF input/output, a second RF input/output, a third RF input/output, a fourth RF input/output, a first RF output, a second RF output, a third RF output, a first RF input, and a second RF input;

a short tester having an RF input/output connected to the second RF input/output of the switch;

an open tester having an RF input/output connected to the third RF input/output of the switch;

a load tester having an RF input/output connected to the fourth RF input/output of the switch;

a dish digital receiver/exciter (DREX) assembly having a 1 pulse per second (PPS) input, a 10 MHz input, a resource period (RP) synchronization (sync) input, a first RF input connected to the RF output of the divider, a second RF input, a third RF input, a first RF output, a fourth RF input connected to the first RF output, a fifth RF input connected to the first RF output of the switch, a second RF output configured to provide a first excitation signal, and a third RF output configured to provide a second excitation signal;

a low noise amplifier (LNA) assembly having a first RF output connected to the second RF input of the dish DREX assembly, a second RF output connected to the third RF input of the dish DREX assembly, a first RF input connected to the second RF output of the switch, a second RF input connected to the third RF output of the switch, a third RF input, and a fourth RF input;

a transmit assembly having a first RF input connected to the third RF output of the dish DREX assembly, a second RF input connected to the second RF output of the dish DREX assembly, a first RF output, and a second RF output;

a first circulator having a first RF input connected to the first RF output of the transmit assembly, an RF output connected to the fourth RF input of the LNA assembly, and an RF input/output;

a second circulator having a first RF input connected to the second RF output of the transmit assembly, an RF output connected to the third RF input of the LNA assembly, and an RF input/output;

a first coupler having a first RF input/output connected to the RF input/output of the first circulator and a second RF input/output;

a second coupler having a first RF input/output connected to the RF input/output of the second circulator and a second RF input/output; and a polarizer having a first RF input/output connected to the second RF input/output of the first circulator, a second RF input/output connected to the second RF input/output of the second circulator, and a third RF input/output comprising the RF output of the optical/RF dish calibrator.

10. A method of antenna array calibration, comprising:

transmitting multiple optical signals by a radio frequency/optical (RF/optical) data center having at least one optical input/output;

receiving the optical signals via multiple single mode fibers (SMFs) each having a proximal end connected to the at least one optical input/output of the RF/optical data center and a distal end, the optical signals received by multiple optical/RF dish calibrators each having an optical input/output connected to the distal end of one of the SMFs and an RF input/output; and receiving multiple RF signals via multiple coaxial transmission lines each having a proximal end connected to the RF input/output of one of the optical/RF dish calibrators and a distal end, the RF signals received by multiple dish antennas each connected to the distal end of one of the coaxial transmission lines;

wherein the RF/optical data center comprises:
an RF measurement system having an RF input/output;
a coaxial transmission line having a proximal end connected to the RF input/output of the RF measurement system and a distal end;
an RF switch having an RF input/output connected to the distal end of the coaxial transmission line and multiple RF input/outputs;
a radar scheduler configured to correct, based on phase information received via the multiple SMFs, each of dish beam position movement, time temporal stability effects, and temperature effects on one or more dish antennas of the multiple dish antennas;
a low phase noise source having a 10 MHz input, a 550 MHz output, a 1 GHz output, a first output bus, and a second output bus;
a calibration manager controller having a 1 pulse per second (PPS) input, an Inter-Range Instrumentation Group Time Code Format B (IRIG B) input, a 10 MHz input, a 10 Gigabit Ethernet (GbE) input, a 1 GbE input, a 550 MHz input connected to the 550 MHz output of the low phase noise source, and a resource period (RP) synchronization (sync) output;
a calibration digital receiver/exciter (DREX) assembly having a 1 GbE input, a 1 PPS input, a 10 MHz input, a first input connected to the RP sync output of the calibration manager controller, a second input connected to the 550 MHz output of the low phase noise source, a calibration DREX data input/output, an output, a third input, and a fourth input;
a dual coupler having a first input/output connected to the output of the calibration DREX assembly, a first output connected to the third input of the calibration DREX assembly, a second output connected to the fourth input of the calibration DREX assembly, and a second input/output;
multiple first dividers each having an input bus connected to the first output bus of the low phase noise source and an output bus;
multiple second dividers each having an input bus connected to the second output bus of the low phase noise source and an output bus;
multiple RF multiplexer assemblies each having an input/output bus connected to the input/output bus of the RF switch, a first input bus connected to the output bus of one of the first dividers, a second input bus connected to the output bus of one of the second dividers, and an optical input/output bus; and
multiple phase stabilization cards each having a first optical input/output bus connected to the optical input/output bus of one of the RF multiplexer assemblies and a second optical input/output bus; and
wherein the RF switch has a 1 GbE input and an RF input/output bus.

11. The method of claim 10, wherein the RF/optical data center further comprises:
multiple bidirectional RF/optical systems each having an RF input/output connected to one of the RF inputs/outputs of the RF switch and an optical input/output.

12. The method of claim 11, wherein each of the bidirectional RF/optical systems comprises:
a broadband combiner having an RF input/output, an RF input, and an RF output;
a fiberoptic transceiver having an RF output connected to the RF input of the broadband combiner, an RF input connected to the RF output of the broadband combiner, an optical input, and an optical output; and
a wavelength division multiplexer (WDM) having an optical output connected to the optical input of the fiberoptic transceiver, an optical input connected to the optical output of the fiberoptic transceiver, and an optical input/output.

13. The method of claim 10, wherein each of the optical/RF dish calibrators comprises:
a bidirectional optical/RF system having an optical input/output; and
a tester having a first RF input/output and a second RF input/output, wherein the tester further comprises:
a clock;
a temperature sensor; and
a movement sensor.

14. The method of claim 13, wherein the bidirectional optical/RF system comprises:
a wavelength division multiplexer (WDM) having an optical input/output, an optical input, and an optical output;
a fiberoptic transceiver having an optical output connected to the optical input of the WDM, an optical input connected to the optical output of the WDM, an RF input, and an RF output; and
a broadband combiner having an RF output connected to the RF input of the fiberoptic transceiver, an RF input connected to the RF output of the fiberoptic transceiver, and an RF input/output.

15. The method of claim 10, wherein the dish antennas comprise at least one receive antenna array and/or at least one transmit antenna array.

16. The method of claim 10, wherein each of the optical/RF dish calibrators comprises:
an optical/RF multiplexer assembly having an optical input/output, a first RF output, a second RF output, and an RF input/output;
a divider having an RF input connected to the first RF output of the optical/RF multiplexer assembly and multiple RF outputs;
a termination (TERM) device having an RF input connected to the second RF output of the optical/RF multiplexer assembly;
a switch having an RF input/output connected to the RF input/output of the optical/RF multiplexer assembly, a first RF input/output, a second RF input/output, a third RF input/output, a fourth RF input/output, a first RF output, a second RF output, a third RF output, a first RF input, and a second RF input;
a short tester having an RF input/output connected to the second RF input/output of the switch;
an open tester having an RF input/output connected to the third RF input/output of the switch;
a load tester having an RF input/output connected to the fourth RF input/output of the switch;
a second DREX assembly having a 1 pulse per second (PPS) input, a 10 MHz input, a resource period (RP) synchronization (sync) input, a first RF input connected to the RF output of the divider, a second RF input, a third RF input, a first RF output, a fourth RF input connected to the first RF output, a fifth RF input connected to the first RF output of the switch, a second RF output configured to provide a first excitation signal, and a third RF output configured to provide a second excitation signal;
a low noise amplifier (LNA) assembly having a first RF output connected to the second RF input of the dish DREX assembly, a second RF output connected to the third RF input of the dish DREX assembly, a first RF input connected to the second RF output of the switch, a second RF input connected to the third RF output of the switch, a third RF input, and a fourth RF input;

a transmit assembly having a first RF input connected to the third RF output of the dish DREX assembly, a second RF input connected to the second RF output of the dish DREX assembly, a first RF output, and a second RF output;

a first circulator having a first RF input connected to the first RF output of the transmit assembly, an RF output connected to the fourth RF input of the LNA assembly, and an RF input/output;

a second circulator having a first RF input connected to the second RF output of the transmit assembly, an RF output connected to the third RF input of the LNA assembly, and an RF input/output;

a first coupler having a first RF input/output connected to the RF input/output of the first circulator and a second RF input/output;

a second coupler having a first RF input/output connected to the RF input/output of the second circulator and a second RF input/output; and a polarizer having a first RF input/output connected to the second RF input/output of the first circulator, a second RF input/output connected to the second RF input/output of the second circulator, and a third RF input/output comprising the RF output of the optical/RF dish calibrator.

17. The method of claim 10, wherein at least two dish antennas of the multiple dish antennas are separated by at least one kilometer.

* * * * *